(12) United States Patent
Noh et al.

(10) Patent No.: US 9,361,019 B2
(45) Date of Patent: Jun. 7, 2016

(54) APPARATUS AND METHOD FOR PROVIDING WEB BROWSER INTERFACE USING GESTURE IN DEVICE

(75) Inventors: Seung-Ku Noh, Suwon-si (KR); Kyung-Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 13/491,451

(22) Filed: Jun. 7, 2012

(65) Prior Publication Data

US 2012/0317503 A1 Dec. 13, 2012

(30) Foreign Application Priority Data

Jun. 7, 2011 (KR) .................. 10-2011-0054547

(51) Int. Cl.
*G06F 3/0488* (2013.01)
*G06F 17/30* (2006.01)
*G06F 9/44* (2006.01)

(52) U.S. Cl.
CPC .......... *G06F 3/04883* (2013.01); *G06F 9/4443* (2013.01); *G06F 17/3089* (2013.01); *G06F 17/30873* (2013.01); *G06F 17/30899* (2013.01); *G06F 17/30905* (2013.01)

(58) Field of Classification Search
CPC .......... G06F 17/3089; G06F 17/30873; G06F 17/30905; G06F 17/30899; G06F 9/4443; G06F 3/04883
USPC ........................................... 715/760
See application file for complete search history.

(56) References Cited

U.S. PATENT DOCUMENTS

| | | | |
|---|---|---|---|
| 8,904,303 B2 | 12/2014 | Chang et al. | |
| 2008/0036743 A1* | 2/2008 | Westerman et al. | 345/173 |
| 2009/0288044 A1* | 11/2009 | Matthews et al. | 715/863 |
| 2010/0015405 A1 | 1/2010 | Bechtold et al. | |
| 2010/0115405 A1* | 5/2010 | Chang et al. | 715/702 |
| 2010/0122194 A1* | 5/2010 | Rogers | 715/769 |
| 2011/0083097 A1* | 4/2011 | Miner et al. | 715/780 |

FOREIGN PATENT DOCUMENTS

| | | |
|---|---|---|
| AU | 2007289019 B2 * | 2/2010 |
| KR | 10-2008-0050895 | 6/2008 |
| KR | 10-2010-0004342 | 1/2010 |
| KR | 2010-0031276 A | 3/2010 |
| KR | 2010-0050948 A | 5/2010 |
| KR | 10-0967338 B1 | 7/2010 |
| KR | 10-2011-0043021 | 4/2011 |

OTHER PUBLICATIONS

International Search Report dated Dec. 26, 2012 in connection with International Patent Application No. PCT/KR2012/004474.
Written Opinion of International Searching Authority dated Dec. 26, 2012 in connection with International Patent Application No. PCT/KR2012/004474.
Patent Examination Report No. 1 dated Feb. 2, 2015 in connection with Australian Patent Application No. 2012267384; 3 pages.

* cited by examiner

*Primary Examiner* — Amy Ng
*Assistant Examiner* — Roland Casillas

(57) ABSTRACT

An apparatus and method provide a web browser interface in a device. A method for providing a web browser interface in a device includes recognizing a gesture motion on an address window region of a web browser, determining a page switch-related function mapped to the recognized gesture motion, and performing the determined page switch-related function.

33 Claims, 13 Drawing Sheets

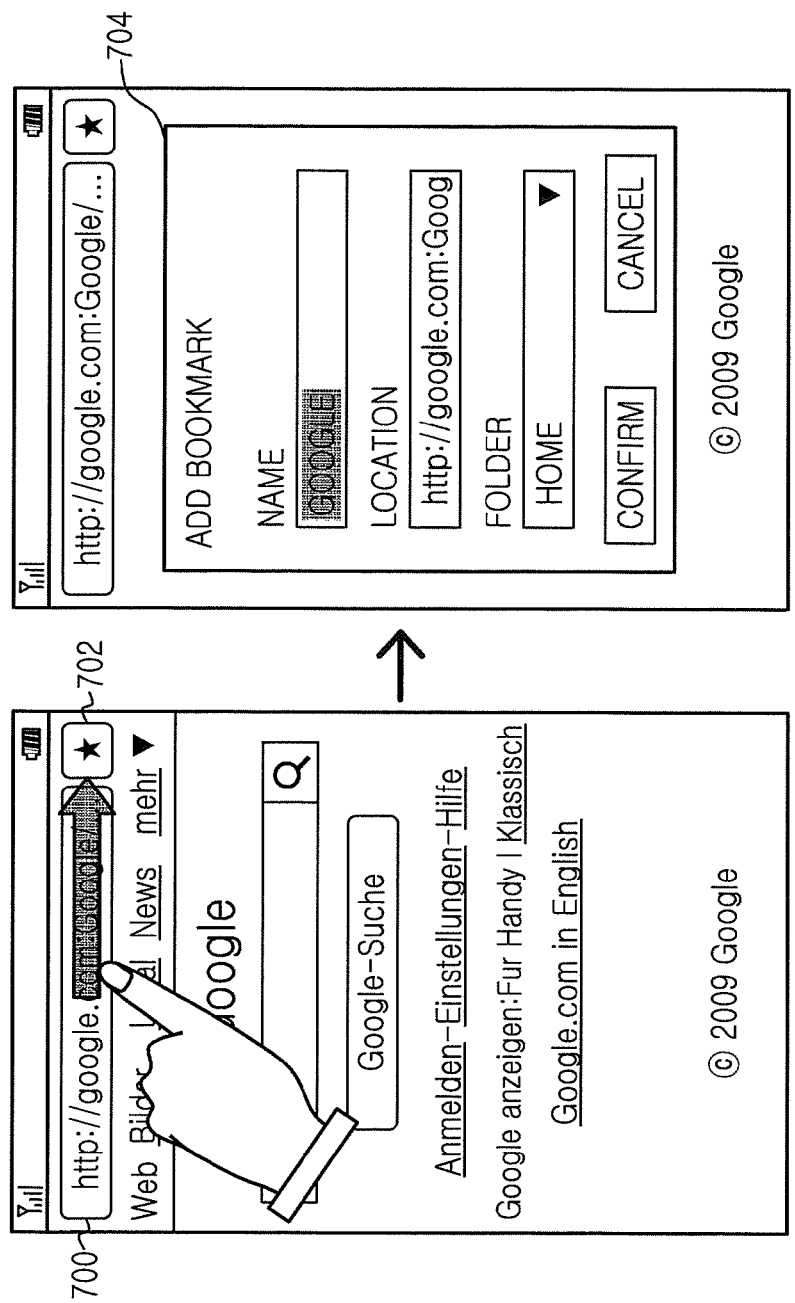

APPARATUS AND METHOD FOR PROVIDING WEB BROWSER INTERFACE USING GESTURE IN DEVICE

CROSS-REFERENCE TO RELATED APPLICATION(S) AND CLAIM OF PRIORITY

The present application is related to and claims priority under 35 U.S.C. §119 to an application filed in the Korean Intellectual Property Office on Jun. 7, 2011 and assigned Serial No. 10-2011-0054547, the contents of which are incorporated herein by reference.

TECHNICAL FIELD OF THE INVENTION

The present invention relates generally to interfacing in a device, and in particular, to an apparatus and method for providing a web browser interface using, gesture in a device.

BACKGROUND OF THE INVENTION

In general, when using a web browser in a mobile terminal (e.g., a portable phone) with a touchscreen, a user has great difficulty in inputting a complex command through the touchscreen. The reason for this is that a display unit of the mobile terminal is much smaller in size than and inferior in function to that of a general computer.

Nevertheless, because a conventional interface of a dedicated mobile web browser imitates an interface of a general computer, a menu icon smaller than a user's finger or a stylus may be displayed on a screen. Accordingly, the user has difficulty in touching the menu icon with a user's finger or a stylus, thus causing many errors. Also, the menu icon occupies a fixed region in the screen, thus causing inconvenience to the user in an interface operation.

A gesture function is proposed to overcome the above limitations. The gesture function maps various functions to gesture motions, thus making it possible to perform a relevant function even without touching a menu icon. However, such a gesture function may overlap with a screen scroll function, thus requiring a complex gesture motion or causing restrictions on implementation. Also, the user needs to learn a complex gesture motion.

SUMMARY OF THE INVENTION

To address the above-discussed deficiencies of the prior art, it is a primary object to provide at least the advantages below. Accordingly, an object of the present disclosure is to provide an apparatus and method for providing a web browser interface using gesture in a device.

Another object of the present disclosure is to provide an apparatus and method for performing a page switch-related function by recognizing a gesture motion on an address window region in a device.

According to an aspect of the present disclosure, a method for providing a web browser interface in a device includes: detecting a gesture motion on an address window region of a web browser, and performing a page switch-related function mapped to the detected gesture motion, wherein the gesture motion includes a touch and a drag from a point of the touch on the address window region.

According to another aspect of the present disclosure, an apparatus for providing a web browser interface in a device includes: a gesture motion recognizing unit configured to detect a gesture motion on an address window region of a web browser; and a function performing unit configured to perform a page switch-related function mapped to the detected gesture motion, wherein the gesture motion includes a touch and a drag from a point of the touch on the address window region.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7A and 7B illustrate a release event at a bookmark button position in a device according to an exemplary embodiment of the present disclosure;

DETAILED DESCRIPTION OF THE PREFERRED EMBODIMENTS

FIGS. 1 through 11C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Exemplary embodiments of the present invention will be described herein below with reference to the accompanying drawings. In the following description, detailed descriptions of well-known functions or configurations will be omitted since they would unnecessarily obscure the subject matters of the present invention. Also, the terms used herein are defined according to the functions of the present invention. Thus, the terms may vary depending on users' or operators' intentions or practices. Therefore, the terms used herein must be understood based on the descriptions made herein.

The present disclosure provides a scheme for providing a web browser interface using gesture in a device. In particular, the present disclosure provides a scheme for performing a page switch-related function by recognizing a gesture motion on an address window region in a device.

Although a mobile terminal providing a dedicated mobile web browser will be exemplified in the following description, it should be understood that the present disclosure may be applicable to any devices (e.g., PCs, notebook computers and tablet terminals) providing a web browser.

Also, although a device having a touchscreen will be exemplified in the following description, it should be understood that the present disclosure may also be applicable to any devices having, other types of input units (e.g., mouse) capable of touch, drag and release. Herein, the term "drag" means to move while touching, and the term "release means to release a touch. Herein, a touch and a touch event are used as the same meaning. Also, a web browser address window region in a device indicates the region showing the address of web page as illustrated in the accompanying figures.

Figure 1:
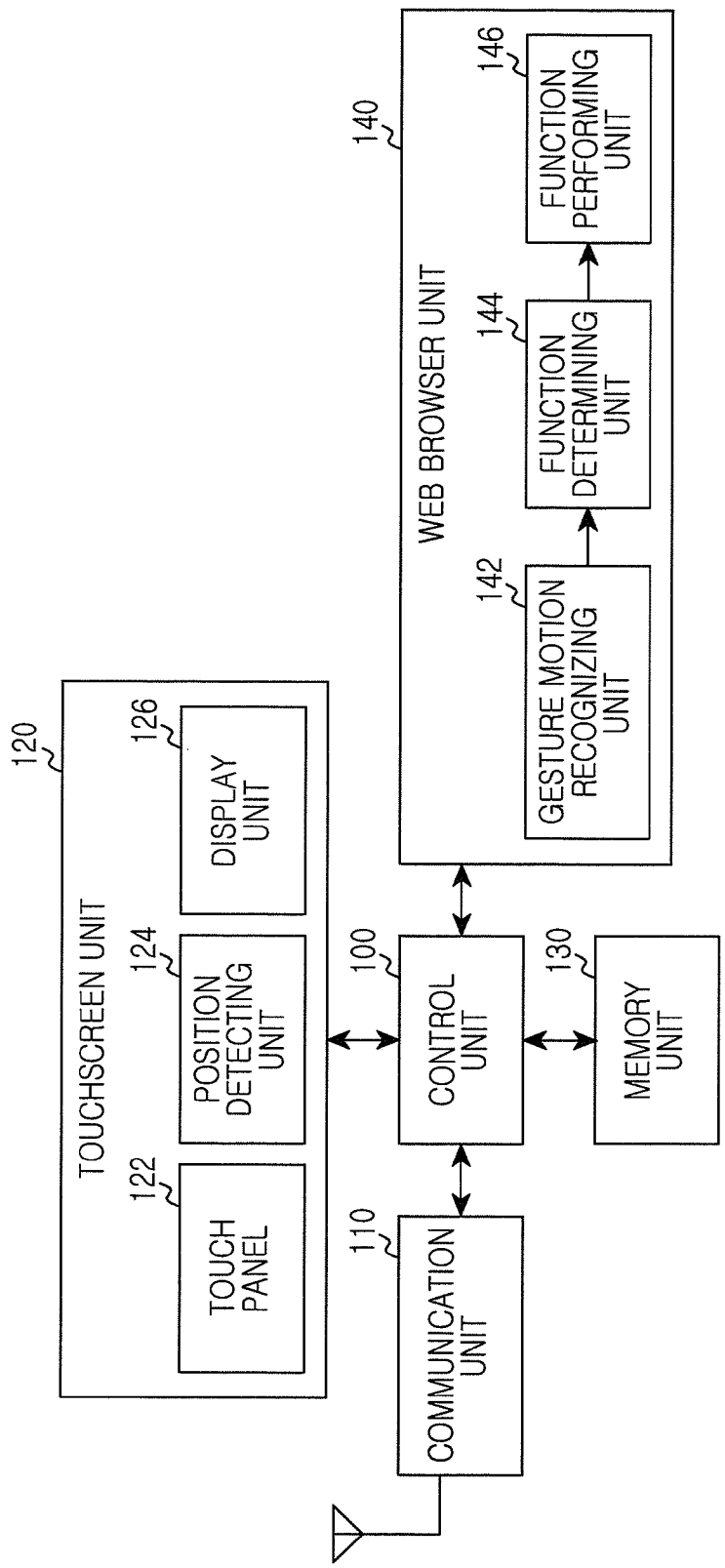
FIG. 1 illustrates a device according to an exemplary embodiment of the present disclosure.

FIG. 1 illustrates a device according to an exemplary embodiment of the present disclosure.

Referring to FIG. 1, the device may include a control unit 100, a communication unit 110, a touchscreen unit 120, a memory unit 130, and a web browser unit 140.

The control unit 100 controls an overall operation of the device. According to an exemplary embodiment, the control unit 100 controls and processes an overall operation for performing a page switch-related function by recognizing a gesture motion on a web browser address window region.

The communication unit 110 transmits/receives Radio Frequency (RF) signals inputted/outputted through an antenna. For example, in a transmitting (TX) mode, the communication unit 110 up-converts a baseband signal into an RE signal and transmits the RF signal through the antenna. In a receiving, (RX) mode, the communication unit 114 receives an RF signal through the antenna and down-converts the RF signal into a baseband signal to restore the original data.

The touchscreen unit 120 may include a touch panel 122, a position detecting unit 124, and a display unit 126. The display unit 126 displays numerals, characters, moving pictures, still pictures and status information generated during an operation of the device. The touch panel 122 is installed at the display unit 126 to display various menus on a screen. When a touch occurs on the screen, the position detecting unit 124 detects and outputs coordinate information of the touch position. That is, when a gesture is inputted using a user's finger or a stylus, the position detecting unit 124 detects and outputs coordinate information corresponding, to the inputted gesture.

The memory unit 130 stores a mapping table defining a page switch-related function on a gesture-by-gesture basis. According to an exemplary embodiment, the mapping table is defined based on at least one of the position of a touch event, the direction of a drag event, and the position of a release event (e.g., the end position of the drag event) on a web browser address window region.

When a web address (URL) is inputted, the web browser unit 140 requests web page data corresponding to the inputted wed address from a web server (not illustrated) on the Internet, processes the web page data received from the web server, and generates a web page to be displayed by the display unit 126. According to an exemplary embodiment, the web browser unit 140 may include a gesture motion recognizing unit 142, a function determining unit 144, and a function performing unit 146. In addition to the general functions, the web browser unit 140 performs a page switch-related function by recognizing a gesture motion on a web browser address window region. The gesture motion recognizing unit 142 recognizes a gesture motion on a web browser address window region. The function determining unit 144 determines a page switch-related function mapped to the recognized gesture motion, with reference to a mapping table that is stored in the memory unit 130 and defines a page switch-related function on a gesture-by-gesture basis. The function performing unit 146 performs the determined page switch-related function.

Figure 2:
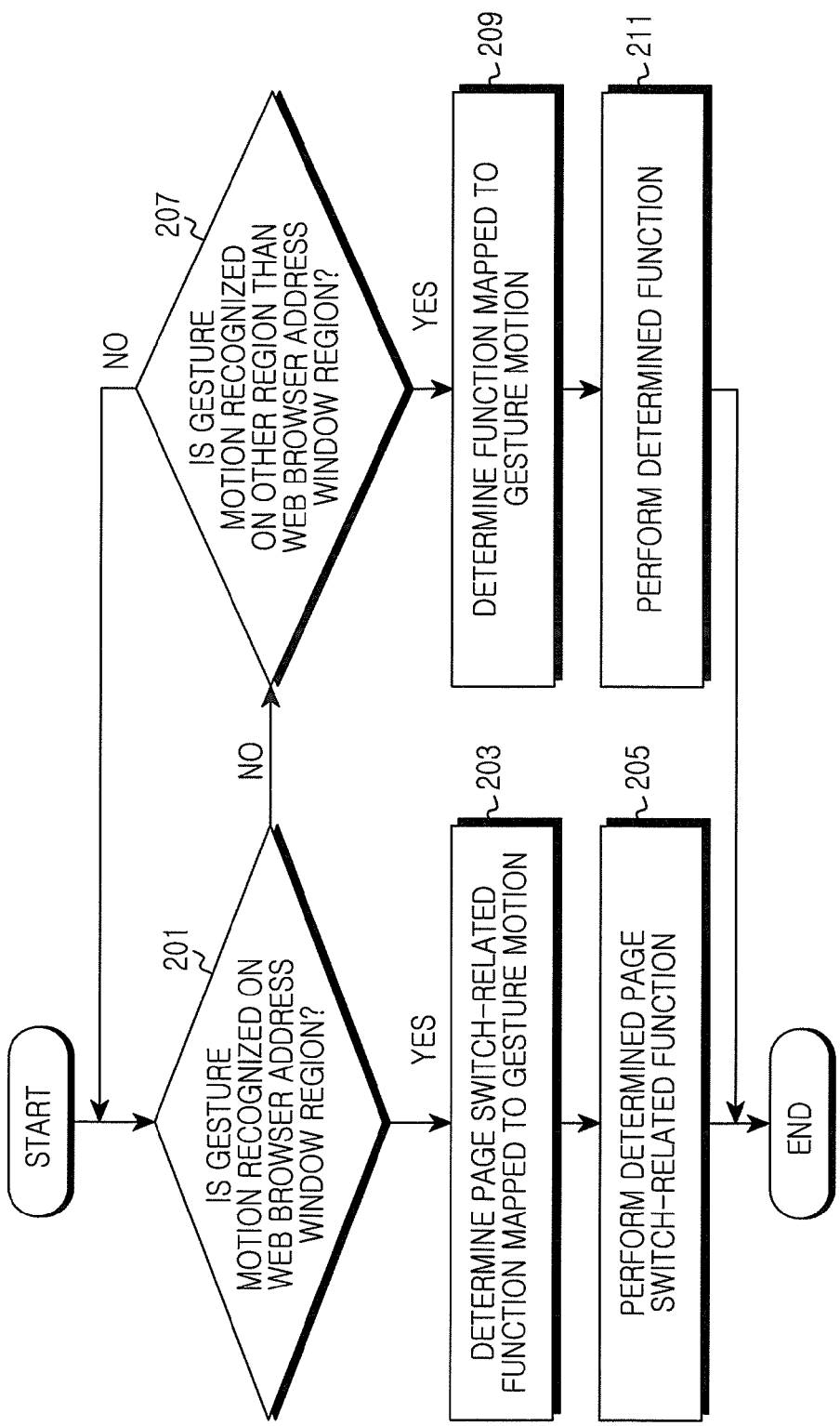
FIG. 2 illustrates a method for providing a web browser interface using gesture in a device according to an exemplary embodiment of the present disclosure.

FIG. 2 illustrates a method for providing a web browser interface using gesture in a device according to an exemplary embodiment of the present disclosure.

Referring to FIG. 2, in step 201, the device determines whether a gesture motion is recognized on a web browser address window region. For example, the device may recognize the gesture motion by detecting a touch event occurring on the web browser address window region and a drag and release event following the touch.

If a gesture motion is recognized on a web browser address window region (in step 201), the device proceeds to step 203. In step 203, the device determines a page switch-related function mapped to the gesture motion on the web browser address window region, with reference to a mapping table defining a page switch-related function on a gesture-by-gesture basis. In step 205, the device performs the determined page switch-related function. For example, when a drag and release event occurs in a leftward/rightward direction after a touch event on a web browser address window region, the device may switch to the next/previous page.

Detailed operations for determining the page switch-related function mapped to the recognized gesture motion and performing the determined page switch-related function will be described below in detail with reference to FIGS. 3A and 3B, by exemplifying a mapping table defining a page switch-related function on a gesture-by-gesture basis.

On the other hand, if a gesture motion is not recognized on a web browser address window region (in step 201), the device proceeds to step 207. In step 207, the device determines whether a gesture motion is recognized on other region than the web browser address window region. For example, the device may recognize the gesture motion by detecting a touch event occurring on other region than the web browser address window region and a drag and release event following the touch event.

If a gesture motion is recognized on other region than the web browser address window region (in step 207), the device proceeds to step 209. In step 209, the device determines a function mapped to the gesture motion on other region than the web browser address window region, with reference to a mapping table defining a gesture-by-gesture function on other region than the web browser address window region. In step 211, the device performs the determined function. Herein, the gesture-by-gesture function on other region than the web browser address window region may include a function irrelevant to a page switch.

On the other hand, if a gesture motion is not recognized on other region than the web browser address window region (in step 207), the device returns to step 201 and repeats the subsequent steps.

Thereafter, the device ends the algorithm according to the present disclosure.

Figure 3A:
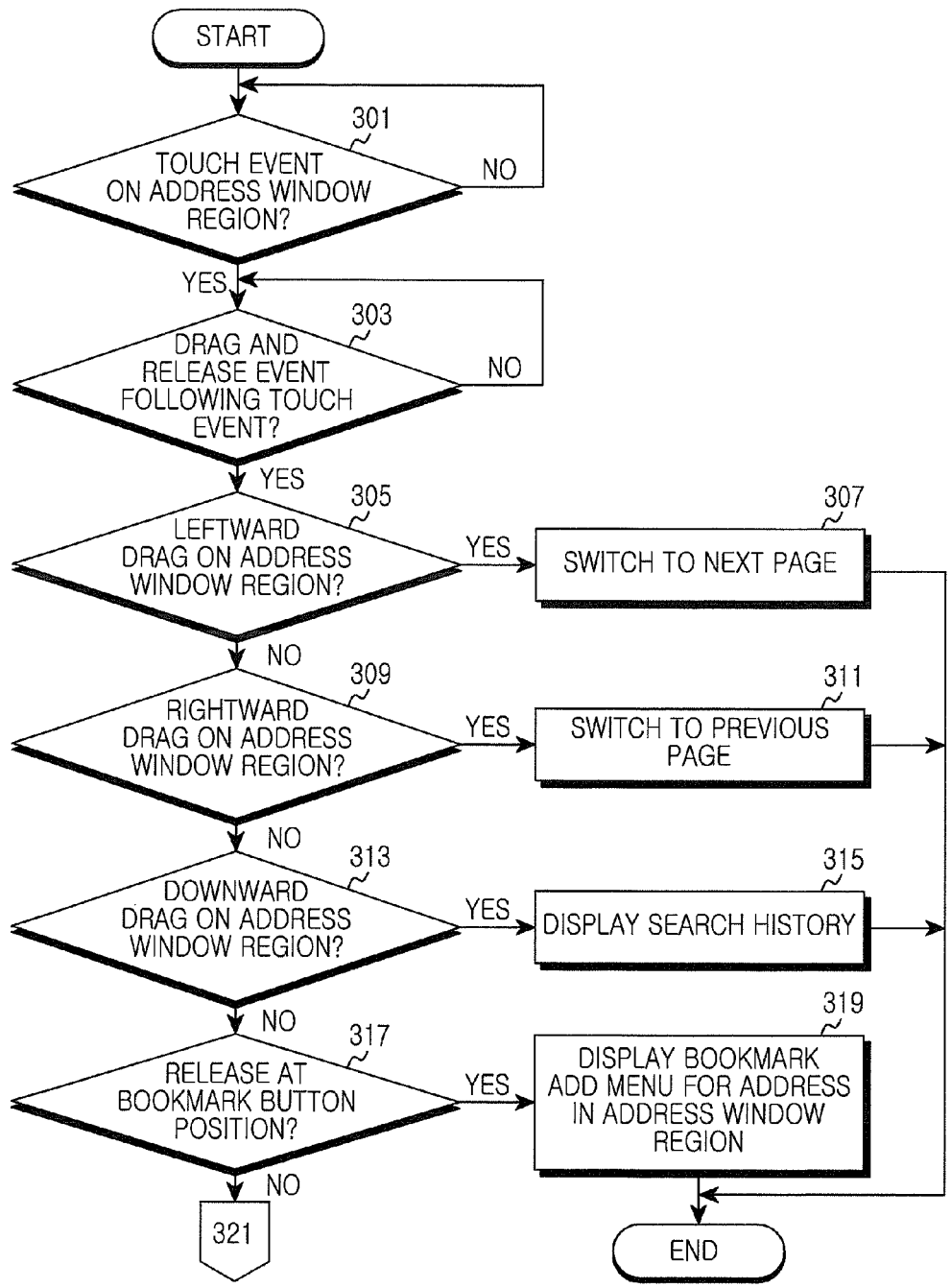
FIGS. 3A and 3B illustrate a method for providing a web browser interface using gesture in a device according to an exemplary embodiment of the present disclosure.
Figure 3B:
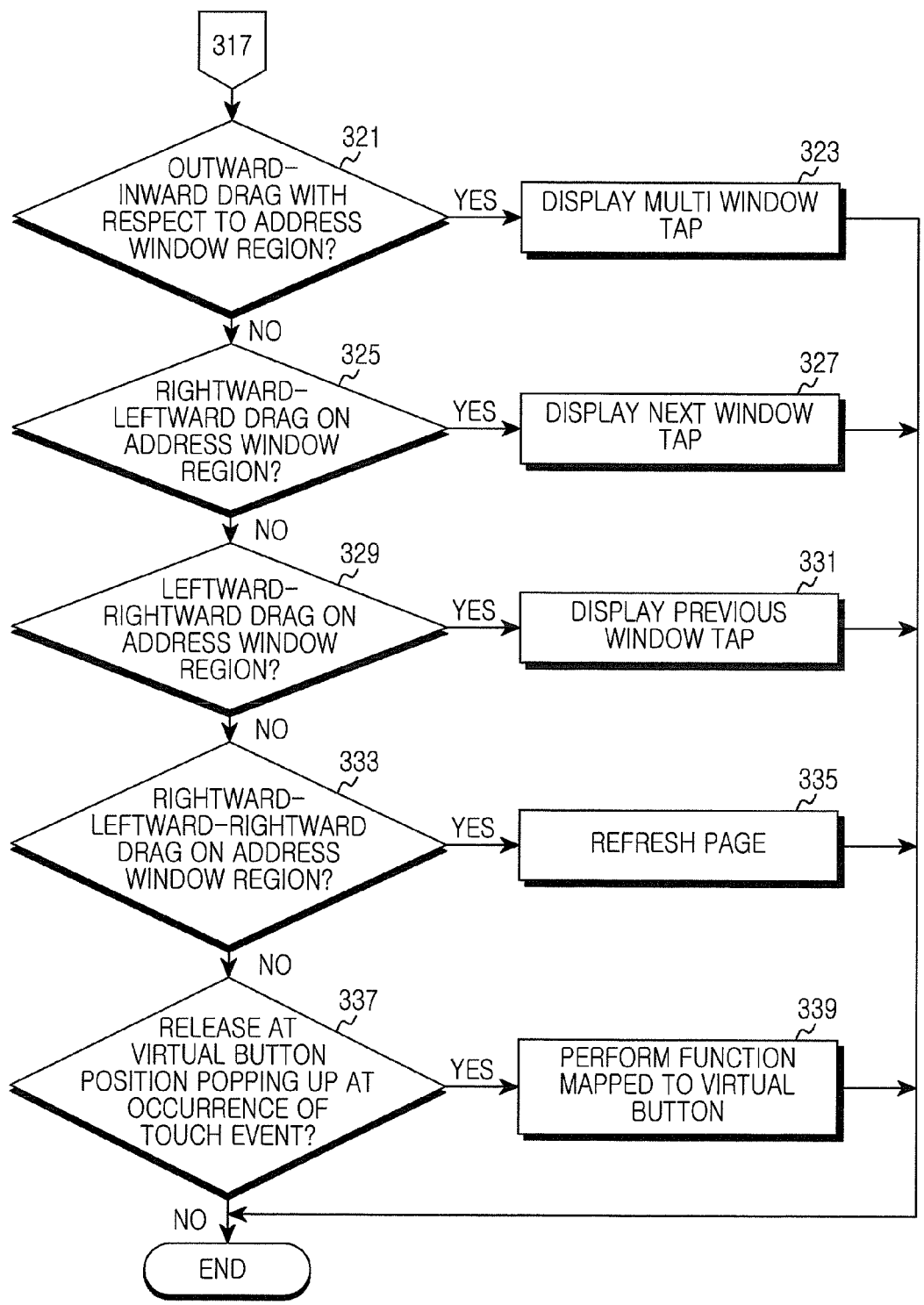

FIGS. 3A and 3B illustrate a method for providing a web browser interface using gesture in a device according to an exemplary embodiment of the present disclosure.

Referring to FIGS. 3A and 3B, in step 301, the device determines whether a touch event occurs on the web browser address window region.

If a touch event occurs on the web browser address window region (in step 301), the device proceeds to step 303. In step 303, the device determines whether a drag and release event occurs after the touch event.

If a drag and release event occurs after the touch event (in step 303), the device proceeds to step 305. In step 305, the device determines whether the drag is a leftward drag on the web browser address window region.

Figure 4:
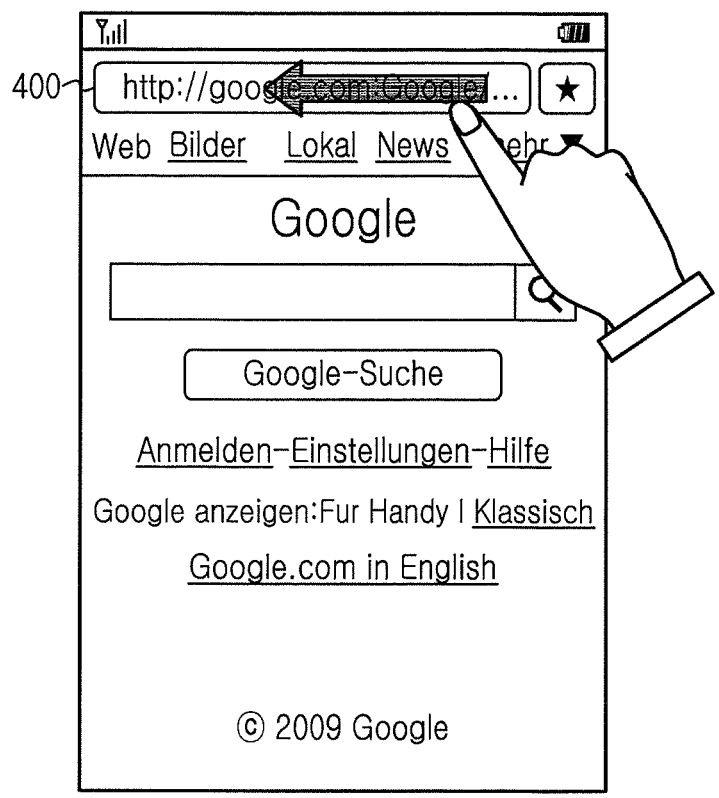
FIG. 4 illustrates a leftward drag event on a web browser address window region in a device according to an exemplary embodiment of the present disclosure.

If the drag is a leftward drag on the web browser address window region (in step 305), the device proceeds to step 307. In step 307, the device determines that a switch to the next page is requested with reference to a mapping table defining a page switch-related function on a gesture-by-gesture basis, switches to the next page, and displays the next page. For example, the device may switch to the next page when detecting a touch event on a web browser address window region 400 and a leftward drag and release event following the touch event, as illustrated in FIG. 4.

On the other hand, if the drag is not a leftward drag on the web browser address window region (in step 305), the device proceeds to step 309. In step 309, the device determines whether the drag is a rightward drag on the web browser address window region.

Figure 5:
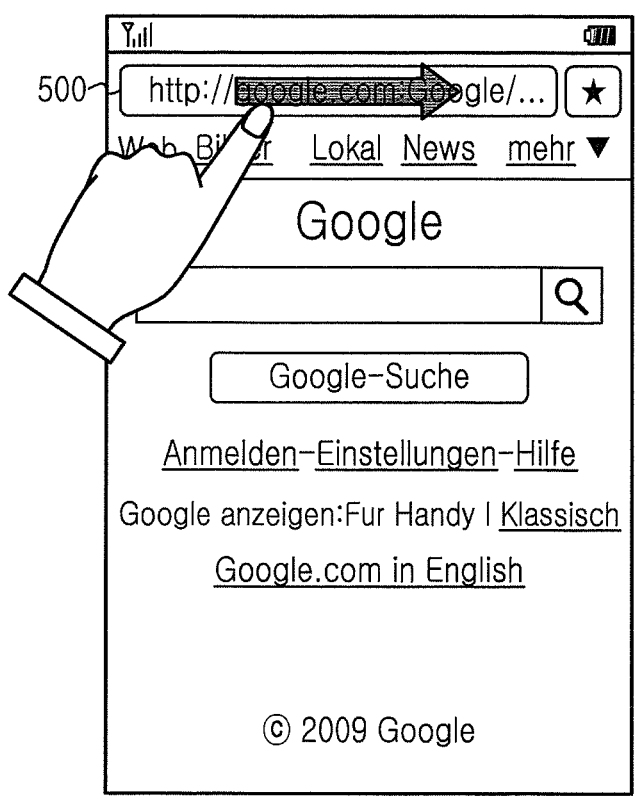
FIG. 5 illustrates a rightward drag event on a web browser address window region in a device according to an exemplary embodiment of the present disclosure.

If the drag is a rightward drag on the web browser address window region (in step 309), the device proceeds to step 311. In step 311, the device determines that a switch to the previous page is requested, with reference to the mapping table, switches to the previous page, and displays the previous page. For example, the device may switch to the previous page when detecting a touch event on a web browser address window region 500 and a rightward drag and release event following the touch event, as illustrated in FIG. 5.

On the other hand, if the drag is not a rightward drag on the web browser address window region (in step 309), the device proceeds to step 313. In step 313, the device determines whether the drag is a downward drag on the web browser address window region.

Figures 6A, 6B:
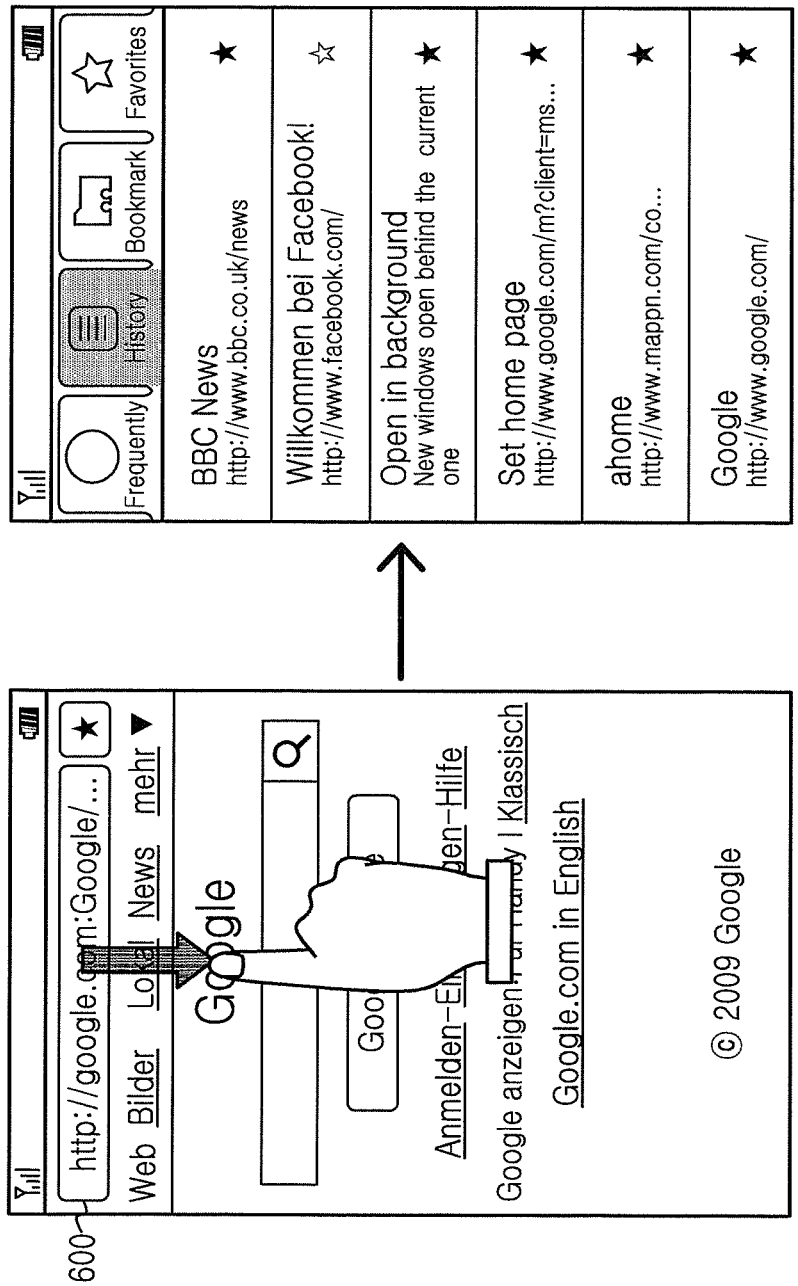
FIGS. 6A and 6B illustrate a downward drag event on a web browser address window region in a device according to an exemplary embodiment of the present disclosure.

If the drag is a downward drag on the web browser address window region (in step 313), the device proceeds to step 315. In step 315, the device determines that a display of a search history is requested, with reference to the mapping table, and displays a search history page. For example, the device may display the search history page when detecting a touch event on a web browser address window region 600 and a downward drag and release event following the touch event, as illustrated in FIGS. 6A and 6B.

On the other hand, if the drag is not a downward drag on the web browser address window region (in step 313), the device proceeds to step 317. In step 317, the device determines whether the release is a release at a bookmark button position.

If the release is a release at a bookmark button position (in step 317), the device proceeds to step 319. In step 319, the device determines that a bookmark addition for an address in the web page address window region is requested, with reference to the mapping table, and displays a bookmark add menu for an address in the web page address window region. For example, the device may display a bookmark add menu 704 for an address in the web page address window region when detecting a touch event on a web browser address window region 700, a drag following the touch event, and a release at a bookmark button position 702, as illustrated in FIGS. 7A and 7B. Although a bookmark button has been exemplified as a button for execution of a bookmark adding function, it should be understood that the present disclosure may also be applicable to various function buttons.

If the release is not a release at a bookmark button position (in step 317), the device proceeds to step 321. In step 321, the device determines whether the drag is an outward-inward drag with respect to the web browser address window region.

Figures 8A, 8B:
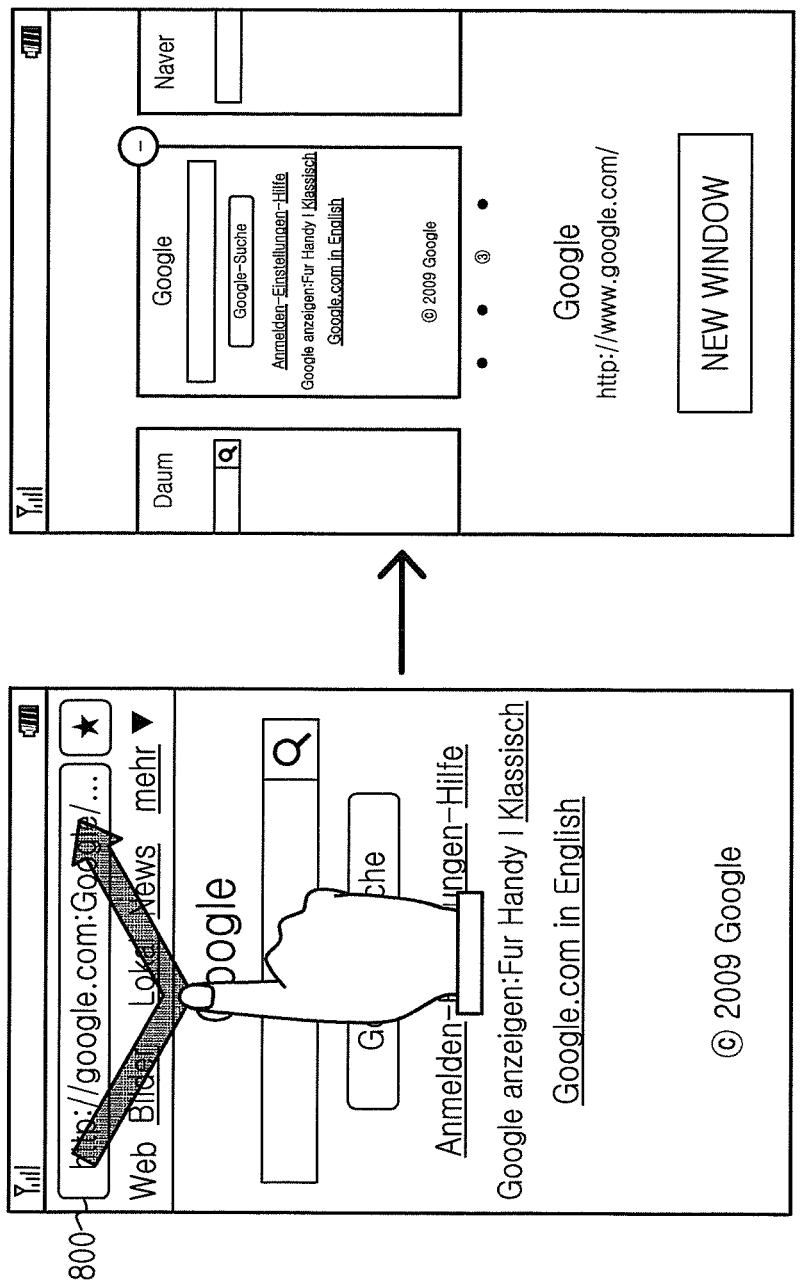
FIGS. 8A and 8B illustrate an outward-inward drag event with respect to a web browser address window region in a device according to an exemplary embodiment of the present disclosure.

If the drag is an outward-inward drag with respect to the web browser address window region (in step 321), the device proceeds to step 323. In step 323, the device determines that a display of a multi window tap is requested, with reference to the mapping table, and displays a multi window tap. For example, the device may display the multi window tap when detecting a touch event on a web browser address window region 800 and an outward-inward drag and release event (with respect to the web browser address window region 800) following the touch event, as illustrated in FIGS. 8A and 8B.

On the other hand, if the drag is not an outward-inward drag with respect to the web browser address window region (in step 321), the device proceeds to step 325. In step 325, the device determines whether the drag is a rightward-leftward drag on the web browser address window region.

Figure 9B:
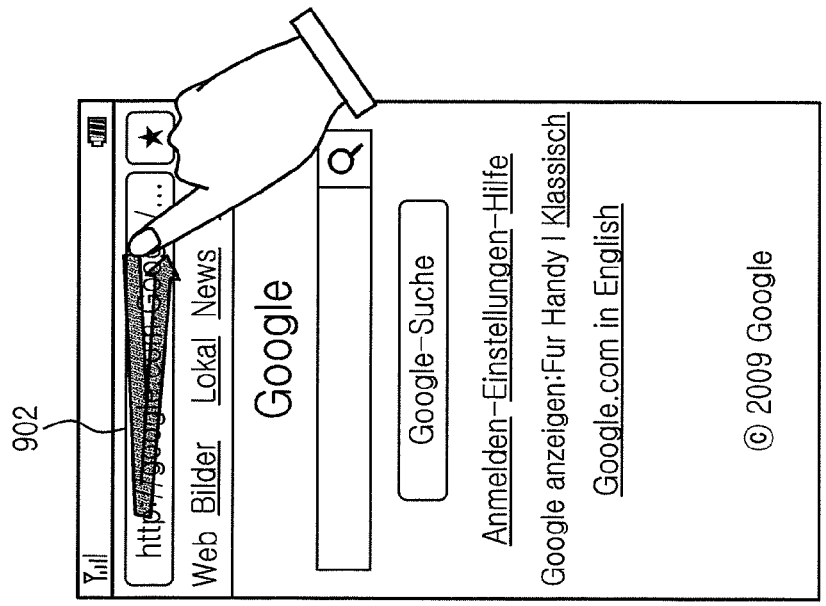
FIGS. 9A to 9C illustrate a rightward-leftward drag event, a leftward-rightward drag event, and a rightward-leftward-rightward drag event on a web browser address window region in a device according to an exemplary embodiment of the present disclosure.
Figure 9A:
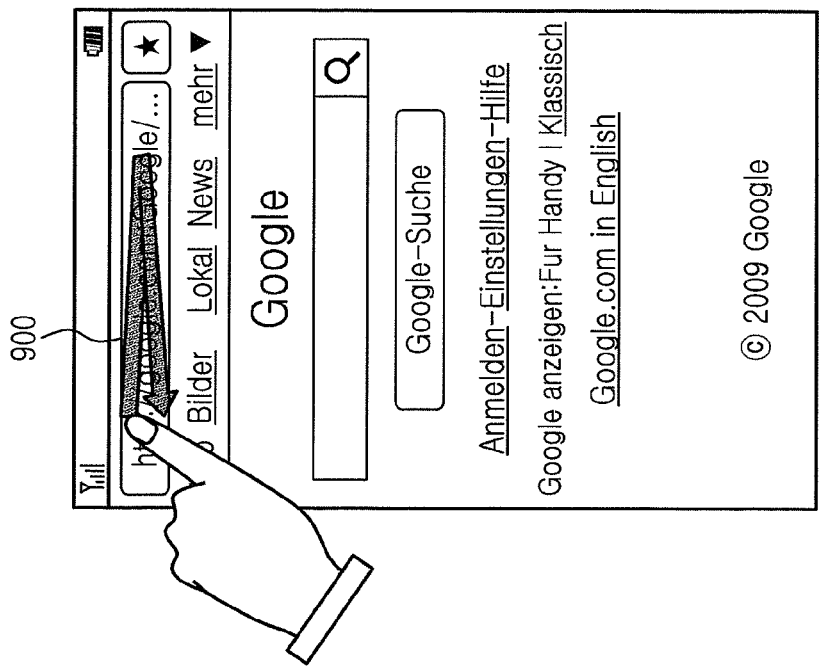

If the drag is a rightward-leftward drag on the web browser address window region (in step 325), the device proceeds to step 327. In step 327, the device determines that a display of a next window tap is requested, with reference to the mapping table, and displays a next window tap. For example, the device may display the next window tap when detecting a touch event on a web browser address window region 900 and a rightward-leftward drag and release event following the touch event, as illustrated in FIG. 9A.

On the other hand, if the drag is not a rightward-leftward drag on the web browser address window region (in step 325), the device proceeds to step 329. In step 329, the device determines whether the drag is a leftward-rightward drag on the web browser address window region.

If the drag is a leftward-rightward drag on the web browser address window region (in step 329), the device proceeds to step 331. In step 331, the device determines that a display of a previous window tap is requested, with reference to the mapping table, and displays a previous window tap. For example, the device may display the previous window tap when detecting a touch event on a web browser address window region 902 and a leftward-rightward drag and release event following the touch event, as illustrated in FIG. 9B.

On the other hand, if the drag is not a leftward-rightward drag on the web browser address window region (in step 329), the device proceeds to step 333. In step 333, the device determines whether the drag is a rightward-leftward-rightward drag on the web browser address window region.

Figure 9C:
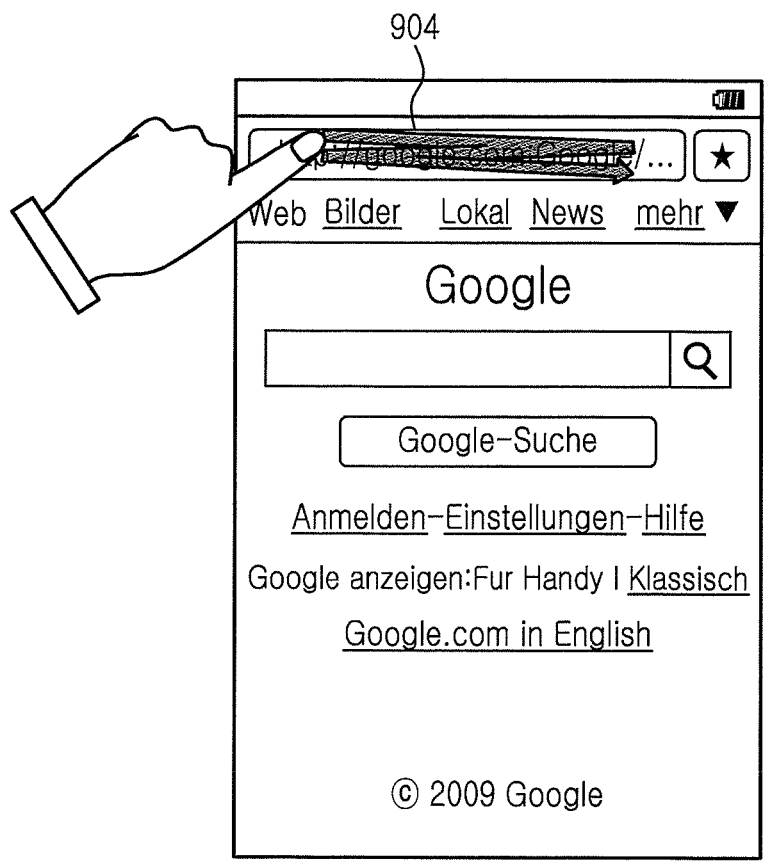

If the drag is a rightward-leftward-rightward drag on the web browser address window region (in step 333), the device proceeds to step 335. In step 335, the device determines that a page refresh is requested, with reference to the mapping table, and performs a page refresh. For example, the device may perform the page refresh when detecting a touch event on a web browser address window region 904 and a rightward-leftward-rightward drag and release event following the touch event, as illustrated in FIG. 9C.

On the other hand, if the drag is not a rightward-leftward-rightward drag on the web browser address window region (in step 333), the device proceeds to step 337. In step 337, the device determines whether the release is a release at a virtual button position pop-up displayed at the occurrence of the touch event.

Figure 10:
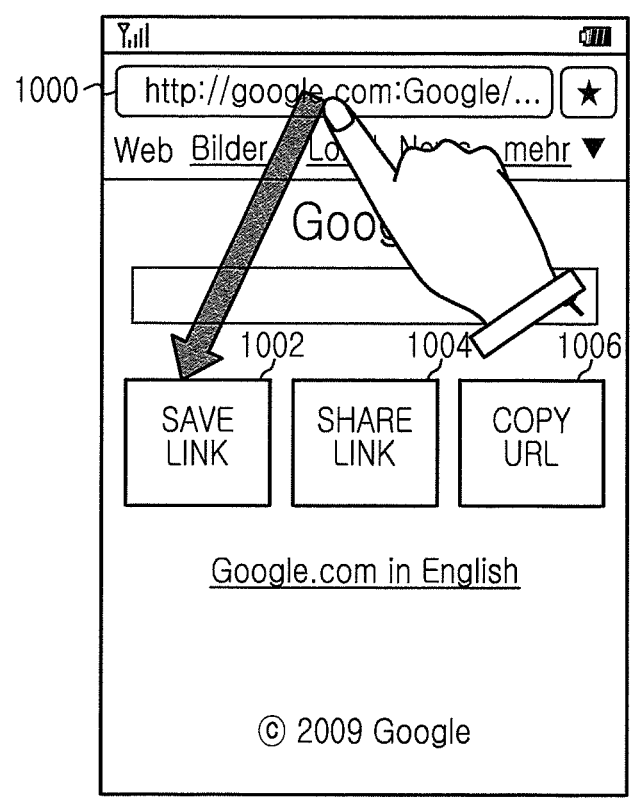
FIG. 10 illustrates a release event at a virtual button position in a device according to an exemplary embodiment of the present disclosure.

If the release is a release at a virtual button position pop-up displayed at the occurrence of the touch event (in step 337), the device proceeds to step 339. In step 339, the device determines that a function mapped to a virtual button is requested, with reference to the mapping table, and performs a function mapped to the virtual button. For example, the device may pop-up display a virtual button 1002 for link storing, a virtual button 1004 for link sharing, and a virtual button 1006 for URL copying, at the occurrence of a touch event, and may perform the function (e.g., a link storing function, a link sharing function, and a URL copying function) mapped to the virtual button when detecting a drag following the touch event on a web browser address window region 1000 and a release at the position of one of the virtual buttons, as illustrated in FIG. 10.

On the other hand, if the release is not a release at a virtual button position pop-up displayed at the occurrence of the touch event (in step 337), the device ends the algorithm according to the present disclosure.

Figure 11A:
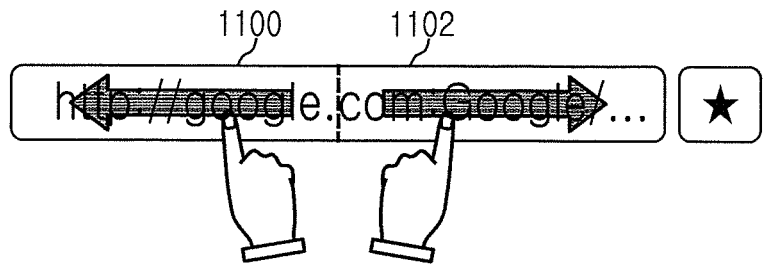
FIGS. 11A to 11C illustrate a drag event based on a predetermined number of divided address window regions or an entire address window region of a web browser in a device according to an exemplary embodiment of the present disclosure.

In an exemplary embodiment, the web browser address window region may be divided into a predetermined number n=2) of sub-regions to discern the switch to the previous/next page, the display of the previous/next multi window tap, or the switch to the first/last page. For example, the web browser address window region may be virtually divided into a first address window region 1100 and a second address window region 1102 as illustrated in FIG. 11A. In this example, the device may switch to the next page when detecting a touch event on the first address window region 1100 and a leftward drag and release event following the touch event, and may switch to the previous page when detecting a touch event on the second address window region 1102 and a rightward drag and release event following the touch event.

Figure 11B:
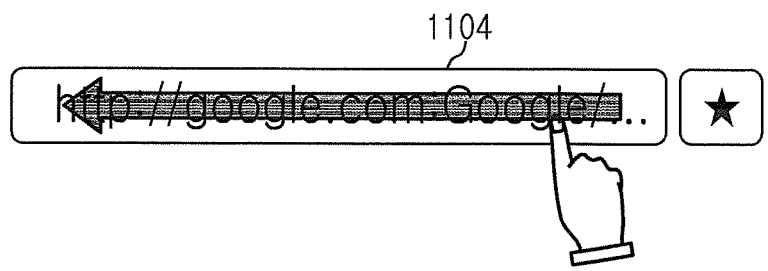
Figure 11C:
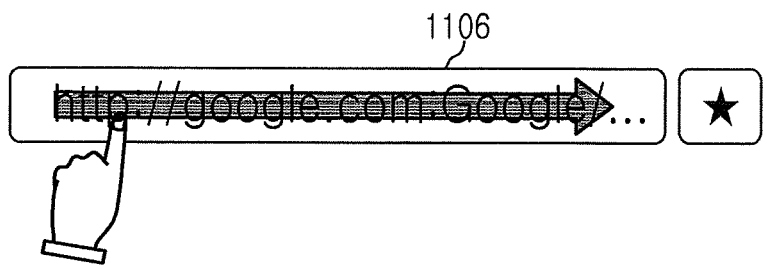

In another exemplary embodiment, the entire web browser address window region may be used to discern the switch to the previous/next page, the display of the previous/next multi window tap, or the switch to the first/last page. For example, as illustrated in FIG. 11B, the device may switch to the next page when detecting a touch event at the right end of a web browser address window region 1104, a leftward drag following the touch event, and a release event at the left end of the web browser address window region 1104. Also, as illustrated in FIG. 11C, the device may switch to the next page when detecting a touch event at the left end of a web browser address window region 1106, a rightward drag following the touch event, and a release event at the right end of the web browser address window region 1106.

As described above, the present disclosure recognizes a gesture motion on a web browser address window region to perform a page switch-related function, thereby making it possible to perform a desired function by a gesture motion alone, without clicking web browser buttons (e.g., a button for a switch to the next page, a button for a switch to the previous page, a search history display button, a bookmark add button, and a page refresh button). Accordingly, the user can browse web sites intuitively and easily.

Also, because the operation of the present disclosure is performed only on the web browser address window region, it does not overlap with a gesture motion or a scroll motion in the page region, thus making it possible to perform a page switch-related function intuitively and without confusion.

Also, in an example where a terminal provides a dedicated mobile web browser having a limited region, the present disclosure can omit various buttons (a button for a switch to the next page, a button for a switch to the previous page, a search history button, a bookmark add button, a multi window tap display button, a next window tap display button, a previous window tap display button, and a page refresh button) mapped to page switch-related functions in the dedicated mobile web browser, thereby making it possible to achieve a wider user interface layout.

While the disclosure has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for providing a web browser interface in a device, comprising:
   detecting a gesture motion on an address window region of a web browser, the address window region configured for display of an address of a displayed webpage;
   determining a function mapped to the detected gesture motion; and
   performing the determined function,
   wherein the gesture motion includes a touch event and a drag event starting on the address window region,
   wherein determining the function comprises:
      determining a switch to a next page when the drag event has occurred in a first direction on the address window region,
      determining a switch to a previous page when the drag event has occurred in a second direction on the address window region,
      determining, when the drag event starting on the address window region moves outside of the address window region and onto the displayed webpage, that the function to perform is not associated with a page switch-related function, and
      determining, when the drag event starting on the address window region moves outside of the address window region and onto the displayed webpage and then returns to the address window region, that the function to perform is to simultaneously display multiple windows for multiple webpages.

2. The method of claim 1, wherein the function is determined with reference to a mapping table defining a function on a gesture-by-gesture basis, wherein the mapping table is defined based on at least one of a position of the touch event, a direction of the drag event, and an end position of the drag event.

3. The method of claim 1, wherein the first direction is a leftward direction and the second direction is a rightward direction.

4. The method of claim 1, wherein determining the function further comprises:
   determining a display of a search history when the drag event starting on the address window region moves outside the address window region and onto the displayed webpage in a third direction away from the address window region.

5. The method of claim 1, wherein:
   the address window region is divided into a plurality of address window sub-regions;
   the switch to the next page is determined when the drag event has occurred in the first direction on a first address window sub-region; and
   the switch to the previous page is determined when the drag event has occurred in the second direction on a second address window sub-region.

6. The method of claim 1, wherein:
   the switch to the next page is determined when the drag event has occurred in the first direction from a first end of the address window region; and
   the switch to the previous page is determined when the drag event has occurred in the second direction from a second end of the address window region.

7. The method of claim 2, wherein determining the function comprises:
   determining a display of a bookmark add menu for an address in the address window region when the drag event has ended at a bookmark button position.

8. The method of claim 1, wherein the address window region is divided into at least two non-overlapping sub regions and determining the switch to the next page comprises determining the switch to the next page when the drag event occurs in a first of the non-overlapping sub regions in the first direction.

9. The method of claim 2, wherein the first direction is an outward direction starting on the address window region and moving outside of the address window region onto the displayed webpage, and the second direction is an inward direction starting outside of the address window region on the displayed webpage and moving inside of the address window region.

10. The method of claim 2, wherein determining the function comprises:
    determining a display of a next window tap when the drag event has occurred in the first direction and in the second direction on the address window region; and
    determining a display of a previous window tap when the drag event has occurred in the second direction and in the first direction on the address window region.

11. The method of claim 10, wherein the first direction is a rightward direction and the second direction is a leftward direction.

12. The method of claim 2, wherein determining the function comprises:
    determining to perform a page refresh function when the drag event has occurred in the first direction, in the second direction, and in the first direction on the address window region.

13. The method of claim 12, wherein the first direction is a rightward direction and the second direction is a leftward direction.

14. The method of claim 2, further comprising:
    in response to detecting that the drag event starting on the address window region moves outside of the address window region and onto the displayed webpage, displaying one or more virtual buttons in a pop-up window,
    wherein the virtual buttons include at least one of a virtual button for link storing, a virtual button for link sharing, and a virtual button for URL copying, and
    wherein determining the function comprises:
    determining to perform a function mapped to one of the virtual buttons when the drag event has ended at a position of the one of the virtual buttons.

15. The method of claim 1, wherein the function includes at least one of a function for a switch to a next page, a function for a switch to a previous page, a search history display function, a bookmark add function, a multi window tap display function, a next window tap display function, a previous window tap display function, and a page refresh function.

16. An apparatus configured to provide a web browser interface in a device, comprising:
    a memory; and
    a controller comprising hardware and operably connected to the memory, the controller configured to:
    detect a gesture motion on an address window region of a web browser, the address window region configured for display of an address of a displayed webpage; and
    determine a function mapped to the detected gesture motion and perform the determined function,
    wherein the gesture motion includes a touch event and a drag event starting on the address window region,
    wherein to determine the function, the controller is further configured to:
    determine a switch to a next page when the drag event has occurred in a first direction on the address window region,
    determine a switch to a previous page when the drag event has occurred in a second direction on the address window region,
    determine, when the drag event starting on the address window region moves outside of the address window region and onto the displayed webpage, that the function to perform is not associated with a page switch-related function, and
    determine, when the drag event starting on the address window region moves outside of the address window region and onto the displayed webpage and then returns to the address window region, that the function to perform is to simultaneously display multiple windows for multiple webpages.

17. The apparatus of claim 16, wherein the controller is further configured to determine the function with reference to a mapping table defining a function on a gesture-by-gesture basis,
    wherein the mapping table is defined based on at least one of a position of the touch event, a direction of the drag event, and an end position of the drag event.

18. The apparatus of claim 16, wherein the first direction is a leftward direction and the second direction is a rightward direction.

19. The apparatus of claim 16, wherein the address window region is divided into a plurality of address window sub-regions, and
    wherein the controller is further configured to:
    determine the switch to the next page when the drag event has occurred in the first direction on a first address window sub-region; and determine the switch to the previous page when the drag event has occurred in the second direction on a second address window sub-region.

20. The apparatus of claim 16, wherein the controller is further configured to:
   determine the switch to the next page when the drag event has occurred in the first direction from a first end of the address window region; and
   determine the switch to the previous page when the drag event has occurred in the second direction from a second end of the address window region.

21. The apparatus of claim 17, wherein the controller is further configured to determine a display of a bookmark add menu for an address in the address window region when the drag event has ended at a bookmark button position.

22. The apparatus of claim 17, wherein the address window region is divided into at least two non-overlapping sub regions and the controller is further configured to determine the switch to the next page when the drag event occurs in a first of the non-overlapping sub regions in the first direction.

23. The apparatus of claim 17, wherein the first direction is an outward direction starting on the address window region and moving outside of the address window region onto the displayed webpage, and the second direction is an inward direction starting outside of the address window region on the displayed webpage and moving inside of the address window region.

24. The apparatus of claim 17, wherein the controller is further configured to:
   determine a display of a next window tap when the drag event has occurred in the first direction and in the second direction on the address window region; and
   determine a display of a previous window tap when the drag event has occurred in the second direction and in the first direction on the address window region.

25. The apparatus of claim 24, wherein the first direction is a rightward direction and the second direction is a leftward direction.

26. The apparatus of claim 17, wherein the controller is further configured to determine to perform a page refresh function when the drag event has occurred in the first direction, in the second direction, and in the first direction on the address window region.

27. The apparatus of claim 26, wherein the first direction is a rightward direction and the second direction is a leftward direction.

28. The apparatus of claim 17, further comprising:
   a display unit configured to display one or more virtual buttons in a pop-up window in response to detection that the drag event starting on the address window region moves outside of the address window region and onto the displayed webpage,
   wherein the virtual buttons include at least one of a virtual button for link storing, a virtual button for link sharing, and a virtual button for URL copying, and
   wherein the controller is further configured to determine to perform a function mapped to one of the virtual buttons when the drag event has ended at a position of the one of the virtual buttons.

29. The apparatus of claim 16, wherein the function includes at least one of a function for a switch to a next page, a function for a switch to a previous page, a search history display function, a bookmark add function, a multi window tap display function, a next window tap display function, a previous window tap display function, and a page refresh function.

30. A method for providing a web browser interface in a device, comprising:
   detecting a gesture motion on an address window region of a web browser, the address window region configured for display of an address of a displayed webpage, the gesture motion including a touch event and a drag event starting on the address window region;
   performing a switch to a next page or a switch to a previous page when the detected gesture motion occurred in a first or second direction on the address window region;
   determining a display of a search history when the gesture motion starting on the address window region moves outside of the address window region and onto the displayed webpage and
   determining to simultaneously display multiple windows for multiple webpages when the gesture motion starting on the address window region moves outside of the address window region and onto the displayed webpage and then returns to the address window region.

31. An apparatus configured to provide a web browser interface in a device, comprising:
   a memory; and
   a controller comprising hardware and operably connected to the memory, the controller configured to:
   determine a function mapped to a gesture motion detected on an address window region of a web browser, the address window region configured for display of an address of a displayed webpage, the gesture motion including a touch event and a drag event starting on the address window region and onto the displayed webpage, the function comprising performing a switch to a next page or a switch to a previous page when the detected first gesture motion occurred in a first or second direction on the address window region;
   determine a display of a search history when the gesture motion starting on the address window region moves outside of the address window region;
   determine to simultaneously display multiple windows for multiple webpages when the gesture motion starting on the address window region moves outside of the address window region and onto the displayed webpage and then returns to the address window region; and
   perform the determined function.

32. A method for providing a web browser interface in a device, the method comprising:
   detecting a gesture motion on a web browser;
   based on detecting the gesture motion on a first region of the web browser, performing a page switch-related function mapped to the detected gesture motion;
   based on detecting the gesture motion starting on the first region and moving onto a displayed webpage of the web browser outside of the first region, performing a displayed screen-related function mapped to the detected gesture motion; and
   based on detecting the gesture motion starting on the first region moving outside of the address window region and onto the displayed webpage and then returning to the first region, performing a function to simultaneously display multiple windows for multiple webpages,
   wherein the first region comprises an address window region of a web browser,
   wherein the address window region is configured for display of an address of the displayed webpage, and
   wherein the gesture motion includes a drag gesture on the web browser.

33. An apparatus configured to provide a web browser interface in a device, the apparatus comprising:

a memory; and a controller comprising hardware and operably connected to the memory, the controller configured to:

detect a gesture motion on a web browser;

based on detecting the gesture motion on a first region of the web browser, perform a page switch-related function mapped to the detected gesture motion; and based on detecting the gesture motion starting on the first region and moving onto a displayed webpage of the web browser outside of the first region, perform a displayed screen-related function mapped to the detected gesture motion; and based on detecting the gesture motion starting on the first region moving outside of the address window region and onto the displayed webpage and then returning to the first region, perform a function to simultaneously display multiple windows for multiple webpages, wherein the first region comprising an address window region of a web browser, wherein the address window region is configured for display of an address of the displayed webpage, and wherein the gesture motion includes a drag gesture on the web browser.

\* \* \* \* \*